(12) United States Patent
Sun

(10) Patent No.: US 12,387,524 B2
(45) Date of Patent: Aug. 12, 2025

(54) BIOMETRIC INFORMATION RECOGNITION MODULE AND ELECTRONIC DEVICE

(71) Applicant: TIANJIN JIIOV TECHNOLOGY CO., LTD., Tianjin (CN)

(72) Inventor: Jiancheng Sun, Beijing (CN)

(73) Assignee: TIANJIN JIIOV TECHNOLOGY CO., LTD., Tianjin (CN)

( * ) Notice: Subject to any disclaimer, the term of this patent is extended or adjusted under 35 U.S.C. 154(b) by 0 days.

(21) Appl. No.: 18/569,394

(22) PCT Filed: Jan. 19, 2022

(86) PCT No.: PCT/CN2022/072813
§ 371 (c)(1),
(2) Date: Dec. 12, 2023

(87) PCT Pub. No.: WO2023/279700
PCT Pub. Date: Jan. 12, 2023

(65) Prior Publication Data
US 2024/0386742 A1  Nov. 21, 2024

(30) Foreign Application Priority Data

Jul. 7, 2021  (CN) .......................... 202110768263.7
Jul. 7, 2021  (CN) .......................... 202121542761.1

(51) Int. Cl.
*G06V 40/13*  (2022.01)
(52) U.S. Cl.
CPC ................................ *G06V 40/1318* (2022.01)
(58) Field of Classification Search
None
See application file for complete search history.

(56) References Cited

U.S. PATENT DOCUMENTS

2017/0220840 A1*  8/2017  Wickboldt ......... G06V 40/1335
2019/0120763 A1*  4/2019  Wu ....................... G01N 21/554
(Continued)

FOREIGN PATENT DOCUMENTS

CN        107480661 A        12/2017
CN        110582780 A        12/2019
(Continued)

OTHER PUBLICATIONS

English Translation of International Search Report and Written Opinion in Application No. PCT/CN2022/072813, mailed Apr. 14, 2022, 7 pages.
(Continued)

*Primary Examiner* — Joseph R Haley
(74) *Attorney, Agent, or Firm* — Meunier Carlin & Curfman LLC

(57) ABSTRACT

A biometric information recognition module and an electronic device are provided, including an optical path guiding layer and a photosensitive pixel array which are arranged in sequence. The optical path guiding layer includes a plurality of optical channels. The photosensitive pixel array includes a plurality of photosensitive pixel units, and light beams carrying biometric information pass through optical channel (s) and are then incident on corresponding photosensitive pixel unit(s), the light path guiding layer including a central region and peripheral region(s) surrounding the central region, and an included angle being formed between an optical channel in the peripheral region and a first straight line perpendicular to the surface of the photosensitive pixel array.

19 Claims, 6 Drawing Sheets

(56) References Cited

U.S. PATENT DOCUMENTS

| | | | | |
|---|---|---|---|---|
| 2020/0150449 A1* | 5/2020 | Lee | ........................ | G02B 5/003 |
| 2020/0210671 A1* | 7/2020 | Ling | ...................... | G02B 27/30 |
| 2020/0234026 A1* | 7/2020 | Du | ..................... | G06V 40/1312 |
| 2021/0357612 A1* | 11/2021 | Yang | ........................ | G02B 6/42 |

FOREIGN PATENT DOCUMENTS

| | | |
|---|---|---|
| CN | 111108511 A | 5/2020 |
| CN | 111523440 A | 8/2020 |
| CN | 111881873 A | 11/2020 |
| CN | 113553925 A | 10/2021 |
| CN | 215987333 U | 3/2022 |
| WO | 2021082680 A1 | 5/2021 |

OTHER PUBLICATIONS

Office Action issued for Chinese Application No. 202110768263.7, dated Sep. 23, 2024.
Notice of Granting Priority right of utility Model Patent Application No. 202121542761.1.

* cited by examiner

BIOMETRIC INFORMATION RECOGNITION MODULE AND ELECTRONIC DEVICE

CROSS REFERENCES

This is a U.S. national stage application of international patent application number PCT/CN2022/072813 filed on Jan. 19, 2022, and claiming priority to the Chinese patent application No. CN 202110768263.7 filed on Jul. 7, 2021, and the Chinese patent application No. CN 202121542761.1 filed on Jul. 7th 2021.

TECHNICAL FIELD

The present disclosure relates to the technical field of electronics, and specifically to a biometric information recognition module and an electronic device.

BACKGROUND ART

With high development of intelligence of terminal electronic devices dominated by handheld mobile terminals, human body biometric information recognition is used increasingly widely in electronic devices in depth, and has been gradually developed from the previous biometric information recognition and unlocking for waking up electronic devices to identity recognition, identity authentication, and the like of various software programs. With the increasingly wide application of the biometric information recognition to the electronic devices, accuracy of the biometric information recognition as well as recognition capability and recognition speed of the electronic devices, especially display-type electronic devices, for fingerprint information are improved.

In the related art, for the biometric information recognition, such as fingerprint recognition, applied to the electronic devices such as mobile phones and tablet computers, a recognition method is mainly optical fingerprint recognition. Generally, a function of recording fingerprints or recognizing specific fingerprints is achieved by irradiating the fingerprints by a light source of a display panel, reflecting the light, and receiving, recording or analyzing by an optical detector fingerprint-reflected light carrying specific biometric information. In recent years, with the demand for miniaturization of the electronic devices such as mobile phones and tablet computers, increasingly higher requirements are also put on thinning and miniaturization of a fingerprint recognition module disposed inside the electronic devices.

Generally, a fingerprint recognition module applied under a display screen needs to realize specific fingerprint recognition by receiving, recording or analyzing the fingerprint-reflected light carrying the specific biometric information. Due to the miniaturization demand for the electronic devices, the optical detector for the fingerprint recognition also needs to be continuously reduced in volume. In order to ensure the accuracy of biometric information recognition, a collection area for the biometric information on the display screen at least should be ensured within a relatively small area range. Taking the fingerprint recognition as an example, the collection area generally should be 6 mm*6 mm or more. This causes it difficult to further structurally reduce the fingerprint recognition module, thus greatly affecting the miniaturization of the electronic devices.

SUMMARY

Embodiments of the present disclosure provide a biometric information recognition module and an electronic device.

By means of modular structural design of optical elements, a range of biometric information image acquisition can be expanded for the biometric information recognition module under the existing structure size, thus, under existing area requirements for biometric information collection, the accuracy of biometric information recognition is ensured, and the structure size of the biometric information recognition module is reduced.

Embodiments of the present disclosure provide a biometric information recognition module. The biometric information recognition module may include an optical path guiding layer and a photosensitive pixel array which are arranged in sequence, the optical path guiding layer may include a plurality of optical channels, the photosensitive pixel array may include a plurality of photosensitive pixel units, and light beams carrying biometric information each pass through the optical channels and then are incident on the corresponding photosensitive pixel units, wherein the optical path guiding layer may include a central region and at least one peripheral region surrounding the central region, and the optical channels in the at least one peripheral region have included angles with a first straight line perpendicular to a surface of the photosensitive pixel array.

Optionally, the included angles of the plurality of optical channels in the at least one peripheral region can be gradually increased in a direction from a center towards an edge of the optical path guiding layer.

Optionally, the included angles of the plurality of optical channels in the at least one peripheral region can be gradually increased at fixed increase amplitude in the direction from the center towards the edge of the optical path guiding layer.

Optionally, the fixed increase amplitude may be 0.05°~2°.

Optionally, the included angles of the plurality of optical channels in the at least one peripheral region are gradually increased at variable increase amplitude in the direction from the center towards the edge of the optical path guiding layer.

Optionally, the variable increase amplitude is gradually decreased in the direction from the center towards the edge of the optical path guiding layer.

Optionally, the plurality of optical channels in the central region and the first straight line may have included angles therebetween, and the included angles are of the same degree, and/or, a plurality of the peripheral regions surrounding the central region may be provided, and the included angles between the plurality of optical channels in the same peripheral region and the first straight line are of the same degree.

Optionally, the optical channels within a width range of one peripheral region are corresponding to 1-10 of the photosensitive pixel units in the photosensitive pixel array.

Optionally, a center of the central region coincides with a center of the peripheral region; and/or, the peripheral region may be in a round ring shape, a square ring shape, a triangular ring shape or an irregular ring shape.

Optionally, on a longitudinal section passing the central region, a plurality of optical channels are arranged in a fan shape centered on the central region.

Optionally, for at least some of the optical channels, channel diameters at ends thereof away from the photosensitive pixel array are greater than or equal to channel diameters at ends thereof close to the photosensitive pixel array.

Optionally, the channel diameters of the optical channels are gradually increased in the direction in which the light beams are incident to the photosensitive pixel units.

Optionally, the central axial lines of the optical channels are second straight lines, and in a longitudinal section passing the second straight lines, two boundaries of each of at least some optical channels form different included angles with the first straight line.

Optionally, for at least some optical channels, the optical channels each have a smaller first boundary angle than a second boundary angle, the first boundary angle is an included angle between the boundary of the optical channel close to the central region and the first straight line, and the second boundary angle is an included angle between the boundary of the optical channel away from the central region and the first straight line.

Optionally, the optical channels in the central region may have included angles with the first straight line, or, the optical channels in the central region are parallel to the first straight line.

Optionally, the optical path guiding layer may be provided with a plurality of collimation holes running therethrough, and the plurality of collimation holes may respectively serve as the optical channels.

Optionally, the optical path guiding layer may include a microlens array and at least one diaphragm layer disposed under the microlens array, a plurality of diaphragm holes that can allow the light beams to pass therethrough are distributed on the diaphragm layer, the microlens array may include a plurality of microlens units, and the microlens units and the diaphragm holes corresponding to the microlens units serve as the optical channels.

Optionally, the optical path guiding layer may include a plurality of diaphragm layers provided spaced apart in a light transmission direction, the diaphragm layers are each distributed thereon with a plurality of diaphragm holes that can allow the light beams to pass therethrough, and the diaphragm holes corresponding to each other in position, on the plurality of diaphragm layers form at least a part of the optical channel.

Optionally, an interval between two adjacent diaphragm layers may be greater than or equal to 5 micrometers.

Optionally, the included angles of the optical channels in the at least one peripheral region may be less than or equal to 60°.

Optionally, the included angles of the optical channels in the at least one peripheral region may be less than or equal to 10°-45°.

Optionally, an optical sensor may be further included, and the photosensitive pixel array is integrated in a photosensitive recognition region of the optical sensor.

Optionally, the optical sensor may include at least one metal structure layer, the optical path guiding layer further may include at least one metal shading layer, and the at least one metal shading layer is realized by also using the at least one metal structure layer on the optical sensor; and the at least one metal shading layer is correspondingly provided with a light-transmitting portion so as to form the optical channel.

Optionally, the at least one metal structure layer may include 2-5 layers.

Some other embodiments of the present disclosure provide an electronic device, wherein the electronic device may include a display screen, and the biometric information recognition module according to any embodiments of the preceding embodiments arranged under the display screen.

Optionally, a biometric information recognition region configured to acquire the light beams carrying the biometric information is pre-provided on the display screen, and an area of the biometric information recognition region may be larger than a light beam reception area of the photosensitive pixel array in the biometric information recognition module.

The biometric information recognition module provided in the embodiments of the present disclosure may include the optical path guiding layer and the photosensitive pixel array which are arranged in sequence. The optical path guiding layer includes a plurality of optical channels. The photosensitive pixel array may include a plurality of photosensitive pixel units. The light beams carrying the biometric information pass through the optical channels respectively and are then incident on the corresponding photosensitive pixel units. In the above, the optical path guiding layer may include the central region and the peripheral region surrounding the central region, and each optical channel in the peripheral region has the included angle with the first straight line perpendicular to the surface of the photosensitive pixel array. Through the guiding effect of the optical channels having the included angles with the first straight line, the light beams carrying the biometric information within a wider region range can be made to be incident on the photosensitive pixel array. That is, without changing the area of the photosensitive pixel array, the biometric information collection area of the display screen is increased, so that the biometric information collection area is greater than the photosensitive region area of the photosensitive pixel array, further enabling the biometric information recognition module in the embodiments of the present disclosure to receive more optical signals, thereby obtaining more biometric information. On the other hand, without increasing the biometric information collection area of the display screen, the photosensitive region area of the photosensitive pixel array is effectively reduced, a volume of the photosensitive pixel array is reduced, cost of the module is reduced, and structural size of the module is efficiently utilized, thereby saving more internal space for the electronic device adopting the biometric information recognition module in the embodiments of the present disclosure.

On the other hand, regarding the fingerprint recognition, when a drier finger is placed on the surface of the display screen, there is a small contact area between the dry finger and the surface of the display screen, and fitting effect between skin of the dry finger and the display screen is also relatively poor, which result in that not only the contact area is reduced, but also for signals which can only be vertically received, the signals of vertically reflected light beams carrying fingerprint information received on the photosensitive pixel array are also relatively weak, causing that recognition effect on the dry finger is relatively poor and recognition failure often occurs. By adopting the biometric information recognition module in the embodiments of the present disclosure, through the guiding effect of the optical channels having the included angles with the first straight line, a part of inclined optical signals carrying the biometric information, from a recognized object which is not in contact with the screen, can be allowed to be incident on the photosensitive pixel array with, so that the photosensitive pixel array receives more optical signals carrying the biometric information, which effectively improves the recognition effect on the dry finger in the fingerprint recognition.

BRIEF DESCRIPTION OF DRAWINGS

In order to more clearly describe technical solutions of embodiments of the present disclosure, drawings that need to be used in the embodiments of the present disclosure will be briefly introduced below. It should be understood that the drawings only show some of the embodiments of the present disclosure, and therefore should not be regarded as limitation to the scope. Those ordinarily skilled in the art still could obtain other relevant drawings according to these drawings without using any inventive efforts.

Figure 1:
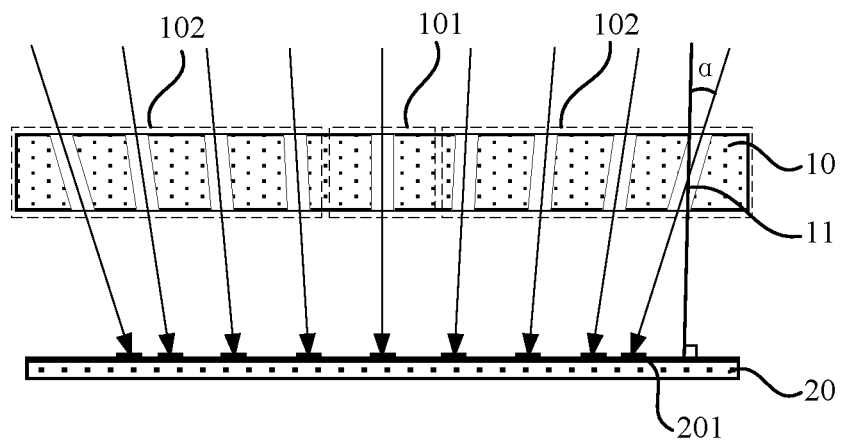
FIG. 1 is a first structural schematic diagram of a biometric information recognition module provided in embodiments of the present disclosure.

Reference signs: 10—optical path guiding layer; 101—central region, 102—peripheral region; 11—optical channel; 110—metal shading layer; 111—light-transmitting portion; 12—basic structure layer; 121—collimation hole; 13—microlens array; 131—microlens unit; 14—diaphragm layer; 140—diaphragm hole; 20—photosensitive pixel array; 201—photosensitive pixel unit; 30—display screen; 301—biometric information recognition region; A20—optical sensor; A1—metal structure layer; A—photosensitive recognition region; D—distance between upper surface of display screen and photosensitive pixel array; H—interval between two adjacent diaphragm layers; L—edge length of photosensitive pixel array; W—area of biometric information recognition region; d1—channel diameter of an end of optical channel away from photosensitive pixel array; d2—channel diameter of an end of optical channel close to the photosensitive pixel array; α—included angle between optical channel and first straight line perpendicular to surface of photosensitive pixel unit 2.

DETAILED DESCRIPTION OF EMBODIMENTS

The technical solutions in the embodiments of the present disclosure will be described clearly and completely below with reference to drawings in the embodiments of the present disclosure.

In the description of the present disclosure, it should be noted that orientation or positional relationships indicated by the terms such as "inner" and "outer" are based on orientation or positional relationships as shown in the drawings, or orientation or positional relationships of a product of the present disclosure conventionally placed in use, merely for the convenience of describing the present disclosure and simplifying the description, rather than indicating or implying that devices or elements referred to have to be in a specific orientation or configured and operated in a specific orientation, therefore, they should not be construed as limitation to the present disclosure. Besides, the terms such as "first" and "second" are merely used to distinguish the description, but should not be construed as indicating or implying importance in the relativity.

It needs to be further noted that unless otherwise specified and defined explicitly, the terms "provide" and "connect" should be construed in a broad sense. For example, it may be a fixed connection, and also may be a detachable connection, or an integrated connection; it may be a direct connection, and also may be an indirect connection through an intermediary or inner communication between two elements. Those ordinarily skilled in the art could understand specific meanings of the above terms in the present disclosure in accordance with specific circumstances.

Biometric recognition technology has been widely applied to various terminal devices or electronic apparatuses. The biometric characteristic recognition technology includes, but not limited to, fingerprint recognition, palm print recognition, vein recognition, iris recognition, face recognition, living body recognition, anti-counterfeit recognition and other technologies. In the above, the fingerprint recognition generally includes optical fingerprint recognition, capacitive fingerprint recognition, and ultrasonic fingerprint recognition. With the rise of full-screen technology, a fingerprint recognition module may be disposed in a partial or whole region under a display screen, so as to form under-display optical fingerprint recognition. Alternatively, an optical fingerprint recognition module also may be partially or completely integrated into a display screen of an electronic device, so as to form in-display optical fingerprint recognition. The display screen may be an organic light emitting diode (OLED) display screen or a liquid crystal display (LCD) screen. A fingerprint recognition method generally includes fingerprint image acquisition, preprocessing, feature extraction, feature matching and other steps. Some or all of the above steps may be realized by a conventional computer vision (CV) algorithm, and also may be realized by a deep learning algorithm based on artificial intelligence (AI). The fingerprint recognition technology may be applied to portable or mobile terminals such as smart phones, tablet computers, and gaming devices, and other electronic devices such as smart door locks, automobiles, and bank automatic tellers, for fingerprint unlocking, fingerprint payment, fingerprint attendance, identity authentication and the like.

A biometric information recognition module applied under a display screen generally needs to realize confirmation and recognition of an individual to which specific biometric information belongs by receiving, recording or analyzing reflected light carrying the specific biometric information. For the display screen provided on the biometric information recognition module, firstly it needs to realize the desired display function, then a collection area that can be obtained by dividing for under-display biometric information recognition is quite limited. Moreover, for extraction of biometric information, sufficient light beams carrying the biometric information in turn are demanded as the basis to obtain accurate recognition information. On this basis, when the module can obtain more light beams carrying the biometric information, the recognition accuracy, anti-interference capability, and counterfeiting recognition ability thereof can be correspondingly improved. Therefore, it is an important problem to be addressed and improved urgently in specific application of the biometric information recognition module that how to sufficiently acquire reflected light beams carrying the specific biometric information within such limited biometric information collection area and process the reflected light beams, to obtain as much specific biometric information as possible from the reflected light beams, so as to effectively improve the accuracy of confirming and recognizing a person to whom the biometric characteristic information belongs.

On this basis, embodiments of the present disclosure provide a biometric information recognition module. FIG. 1 is a first structural schematic diagram of a biometric information recognition module provided in embodiments of the present disclosure. As shown in FIG. 1, the biometric information recognition module may include an optical path guiding layer 10 and a photosensitive pixel array 20 which are arranged in sequence. The optical path guiding layer 10 may include a plurality of optical channels 11. The photosensitive pixel array 20 may include a plurality of photosensitive pixel units 201. Light beams carrying biometric information can pass through the optical channels 11 and then be incident on the corresponding photosensitive pixel units 201. In the above, the optical path guiding layer 10 may include a central region 101 and a peripheral region 102 surrounding the central region 101, and the optical channels 11 in the peripheral region 102 may have included angles with a first straight line perpendicular to a surface of the photosensitive pixel array 20.

As shown in FIG. 1, the optical path guiding layer 10 and the photosensitive pixel array 20 are arranged in sequence in a transmission direction of the light beams carrying the biometric information. The optical path guiding layer 10 may include a plurality of optical channels 11. Generally, the plurality of optical channels 11 are arranged in a matrix form on the optical path guiding layer 10, and each optical channel 11 can allow the light beams carrying the biometric information to pass therethrough. The photosensitive pixel array 20 may include a plurality of photosensitive pixel units 201. The plurality of photosensitive pixel units 201 are also arranged in a matrix form. Exemplarily, the photosensitive pixel array 20 may be a sensing means, such as an optical sensor, capable of receiving light beams and analyzing and processing the biometric information carried in the light beams. Each photosensitive pixel unit 201 of the photosensitive pixel array 20 may receive incident light beams carrying the biometric information and perform corresponding signal processing. The surface of the photosensitive pixel array 20 is usually a plane surface. A plane surface formed by a plurality of photosensitive pixel units 201 arranged in a matrix form serves as a photosensitive region of the photosensitive pixel array 20.

The light beams carrying the biometric information guided through by the plurality of optical channels 11 are correspondingly incident into the photosensitive pixel units 201. As shown in FIG. 1, the optical path guiding layer 10 is divided into the central region 101 and the peripheral region 102 surrounding the central region 101. In the above, each optical channel 11 located in the peripheral region 102 has the included angle α with the first straight line perpendicular to the surface of the photosensitive pixel unit 201. That is, when the biometric information recognition module in the embodiment of the present disclosure is placed in a way as shown in FIG. 1, the optical channels 11 located in the peripheral region 102 are in an inclined state. In this way, in cases where a range of the photosensitive region of the photosensitive pixel array 20 is unchanged, since the optical channels 11 are in the inclined state, an incidence range of the light beams carrying the biometric information can be increased, that is, the photosensitive pixel array 20 can be allowed to receive more light beams carrying the biometric information.

In the above, in the embodiments of the present disclosure, the optical channels 11 are not limited to the form shown in FIG. 1. As optical elements that transmit and guide the light beams carrying the biometric information to the photosensitive pixel array 20, the optical channels 11 can be implemented in a variety of forms, which are not specifically limited in the embodiments of the present disclosure, as long as they can deliver the light beams carrying the biometric information and finally transmit the same to the photosensitive pixel array 20. Moreover, in order to enable as many light beams carrying the biometric information as possible to be received by the photosensitive pixel array 20, the optical channels 11 in the peripheral region 102 are made to be in the inclined state. In this way, a boundary of a biometric information collection region of a display screen can be expanded according to an inclination angle, so that an area of the biometric information collection region is enlarged to a certain extent.

In the above, the biometric information recognition of the biometric information recognition module in the embodiments of the present disclosure may include fingerprint recognition on handheld display devices such as mobile phones and tablet computers which are common in the related art, further include recognition of palm prints, palm veins or joint lines of human body which is used on other electronic devices, and also may include, for another example, recognition of information such as wrist veins and lines in wearable devices. For ease of understanding and description, the fingerprint recognition on the handheld display devices which is relatively common in real life is taken as an example in most of the following descriptions.

In addition, in the embodiments of the present disclosure, division between the central region 101 and the peripheral region 102 is not specifically limited, wherein the central region 101 at least may include a geometric center position of a physical structure on which the optical path guiding layer 10 relies, and the peripheral region 102 is arranged surrounding the central region 101. Those skilled in the art could specifically set parameters of correlations, such as area ratio, between the central region 101 and the peripheral region 102 as needed. For example, the central region 101 is reduced to include almost only the geometric central point, and it is also feasible to enlarge the central region 101, so that a larger region including the geometric center is the central region 101. Likewise, the peripheral region 102 is arranged surrounding the central region. A surrounding shape and the number of surrounding turns of the peripheral region 102, as well as whether providing other regions in addition to the central region 101 and the peripheral region 102 can all be specifically designed and set as actually needed.

It should be noted that, in the biometric information recognition module in the embodiments of the present disclosure, how to arrange the optical channels 11 in the central region 101 of the optical path guiding layer 10 and whether there is an inclination angle are not specifically limited herein, and are not conditions or restrictions that limit implementation of the present solution.

The biometric information recognition module provided in the embodiments of the present disclosure includes the optical path guiding layer 10 and the photosensitive pixel array 20 which are arranged in sequence. The optical path guiding layer 10 may include a plurality of optical channels 11. The photosensitive pixel array 20 may include a plurality of photosensitive pixel units 201. The light beams carrying the biometric information can pass through the optical channels 11 and then be incident on the corresponding photosensitive pixel units 201. In the above, the optical path guiding layer 10 may include the central region 101 and the peripheral region 102 surrounding the central region 101, and each optical channel 11 in the peripheral region 102 may have the included angle α with the first straight line perpendicular to the surface of the photosensitive pixel array 20. Through the guiding effect of the optical channels having the included angles with the first straight line, the light beams carrying the biometric information within a wider region range can be allowed to be incident on the photosensitive pixel array. That is, in cases where the area of the photosensitive pixel array 20 is unchanged, the biometric information collection area of the display screen is increased, so that the biometric information collection area is greater than the area of the photosensitive pixel array 20, further enabling the biometric information recognition module in the embodiments of the present disclosure to receive more optical signals, thereby obtaining more biometric information. On the other hand, without increasing the biometric information collection area of the display screen, a photosensitive region area of the photosensitive pixel array 20 is effectively reduced, a volume of the photosensitive pixel array 20 is reduced, cost of the module is reduced, and structural size of the module is efficiently utilized, thereby saving more internal space for the electronic device adopting the biometric information recognition module in the embodiments of the present disclosure.

On the other hand, regarding the fingerprint recognition, when a drier finger is placed on the surface of the display screen, there is a small contact area between the dry finger and the surface of the display screen, and fitting effect between skin of the dry finger and the display screen is also relatively poor, which results in that not only the contact area is reduced, but also for signals which can only be vertically received, the signals of vertically reflected light beams carrying fingerprint information received on the photosensitive pixel array 20 are also relatively weak, causing that recognition effect on the dry finger is relatively poor, and recognition failure often occurs. By adopting the biometric information recognition module in the embodiments of the present disclosure, through the guiding effect of the optical channels 11 having the included angles α with the first straight line, a part of inclined optical signals carrying the biometric information, from a recognized object which is not in contact with the screen, can be allowed to be incident on the photosensitive pixel array 20, so that the photosensitive pixel array 20 receives more optical signals carrying the biometric information, which effectively improves the recognition effect on the dry finger in the fingerprint recognition.

In an optional implementation of the embodiments of the present disclosure, as shown in FIG. 1, the optical path guiding layer 10 is a basic structure layer 12, wherein the basic structure layer 12 is provided with a plurality of collimation holes 121 running therethrough, and the plurality of collimation holes 121 may respectively serve as the optical channels 11 for guiding the light beams carrying the biometric information to the corresponding photosensitive pixel units 201.

As shown in FIG. 1, the basic structure layer 12 is made of a conventional basic material. Since the basic structure layer 12 is provided mainly for forming the structure of the collimation holes 121, and the basic structure layer 12 itself does not need to play a role, the material of the basic structure layer 12 is not specifically limited in the embodiments of the present disclosure. Usually, the basic structure layer 12 itself has a certain thickness, and the plurality of collimation holes 121 are provided running through the basic structure layer 12. Through arrangement positions as well as directions and angles of the collimation holes 121 running through the basic structure layer 12, optical path directions of the optical channels 11 (the collimation holes 121) can be determined. Thus, in the case where the biometric information recognition module in the present embodiment is used for the under-display fingerprint recognition, when the finger is placed in an image acquisition region on the display screen, emergent light beams irradiate the finger and are reflected. As fingerprint lines on human fingers are different from each other, the light beams that irradiate the finger and are reflected and carry information about valleys or ridges at specific positions of the fingerprints or further other fingerprint feature information are also reflected. The reflected light beams carrying the fingerprint information, after passing through the collimation holes 121, can be accurately guided by the collimation holes 121 to the photosensitive pixel units 201, on the photosensitive pixel array 20, corresponding to the optical channels where the collimation holes 121 are located.

Since the light beams passing through the collimation holes 121 need to carry the biometric information for effective recognition on the photosensitive pixel array 20, in order to avoid mutual interference between light beams from adjacent collimation holes 121, exemplarily, the basic structure layer 12 may be made of a black or dark material, so that the light beams cannot propagate or affect each other in the basic structure layer 12, and the light beams only can be transmitted through the collimation holes 121. For another example, the basic structure layer 12 itself may also be made of a light-permeable material, but a shading film layer is formed on an inner wall of each collimation hole by coating, deposition or other methods, so as to avoid cross-influence between the light beams from adjacent collimation holes 121.

In this way, still as shown in FIG. 1, without changing the size of the biometric information collection region at the display screen, when collecting the fingerprints, the inclined optical channels in the peripheral region 102 not only allow the light beams carrying the fingerprint information in the biometric information collection region to be vertically incident on the optical path guiding layer 10 as well as extraction and recording of the fingerprint information, but also allow further appropriate expansion of an outer edge of the biometric information collection region on the premise that the biometric information collection region has the same area as that of the photosensitive region of the photosensitive pixel array 20, so that a part of light beams that are not vertically incident and originally located not far away outside the biometric information collection region can be incident on the photosensitive region of the photosensitive pixel array 20 and be collected and recorded. As this part of light beams that originally cannot be incident or collected enter the photosensitive pixel array 20 of the biometric information recognition module in the embodiments of the present disclosure, the area of the photosensitive region of the photosensitive pixel array 20 can be reduced and the same number of light beams carrying the biometric information as before can be received, without increasing the area of the biometric information collection region of the display screen. From another perspective, it can also be understood as that if the area of the photosensitive region of the photosensitive pixel array 20 is not reduced, the biometric information recognition module in the embodiments of the present disclosure can effectively increase the incident range and the number of the light beams carrying the fingerprint information, and further improve the accuracy and recognition efficiency of the fingerprint recognition.

By taking the collimation holes 121 provided in the basic structure layer 12 as the optical channels 11, firstly, the basic structure layer 12 is selected to be made of a material that has strong structural stability and is not easy to react with other structures, then once the optical channels 11 formed by the collimation holes 121 are established, the inclination angle will not easily change, and the optical channels 11 also will not be easily deformed due to long time or man-made external factors. The basic structure layer 12 usually has a certain thickness in the module. By utilizing the thickness of the basic structure layer 12, the collimation holes 121 can determine, according to the positions and inclination angles thereof running through the basic structure layer 12, directions of the light beams passing through the collimation holes 121 and specific positions where the light beams exit on the photosensitive pixel units 201.

Figure 2:
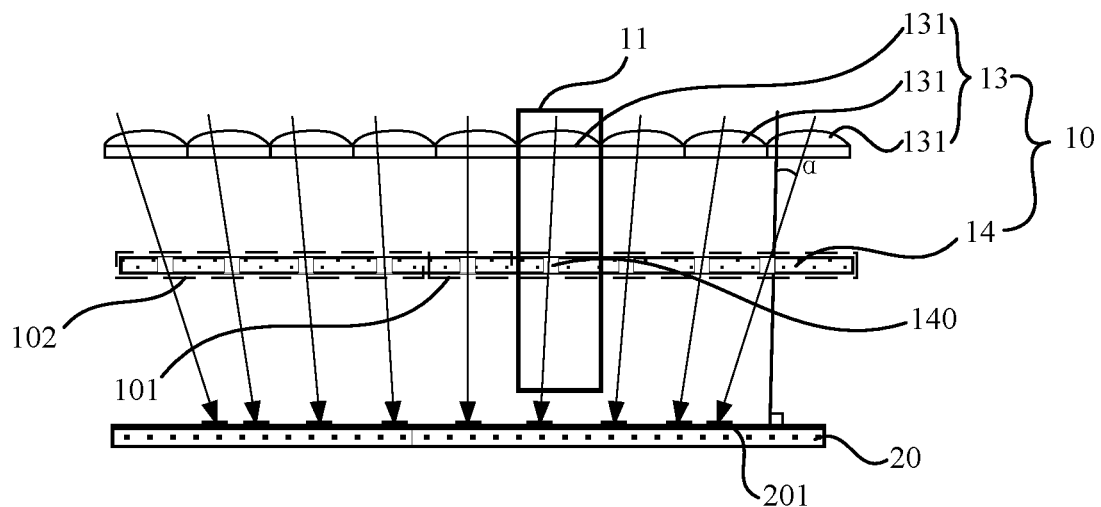
FIG. 2 is a second structural schematic diagram of a biometric information recognition module provided in embodiments of the present disclosure.

FIG. 2 is a second structural schematic diagram of a biometric information recognition module provided in embodiments of the present disclosure. In an optional implementation of the embodiments of the present disclosure, as shown in FIG. 2, the optical path guiding layer 10 may include a microlens array 13 and at least one diaphragm layer 14 disposed under the microlens array 13. A plurality of diaphragm holes 140 that can allow the light beams to pass therethrough can be distributed on the diaphragm layer 14. The microlens array 13 may include a plurality of microlens units 131. Each microlens unit 131 and the diaphragm holes 140 corresponding to the microlens unit 131 serve as one optical channel 11.

As shown in FIG. 2, each optical channel 11 may include the microlens units 131 for being combined to form the microlens array 13, and at least one layer of diaphragm holes 140 located at a light emergent side of the microlens units 131 and corresponding to the microlens units 131. The light beams carrying the biometric information first pass through the microlens units 131. The microlens units 131 can converge and guide the light beams to a certain extent. The converging function per se for the light beams can converge as many light beams as possible to be guided into the photosensitive pixel units 201. The converged light beams pass through the diaphragm holes 140 and then are incident on the photosensitive pixel units 201. Since the light beams carrying the biometric information need to pass through the microlens units 131 and at least one diaphragm hole 140 in sequence, the optical channel 11 is formed thereby, and the inclination angle of the optical channel 11 is just the included angle α between the first straight line and a connecting line between a main optical axis of the microlens unit 131 and a center of the diaphragm hole 140.

In this embodiment, the included angle α of the optical channel 11 can be adjusted by adjusting and changing a projection relationship between the microlens unit 131 and the diaphragm hole 140. By adjusting a relative positional relationship between the microlens unit 131 and the diaphragm hole 140, the included angle α of the optical channel 11 can be changed in direction and angle.

Figure 3:
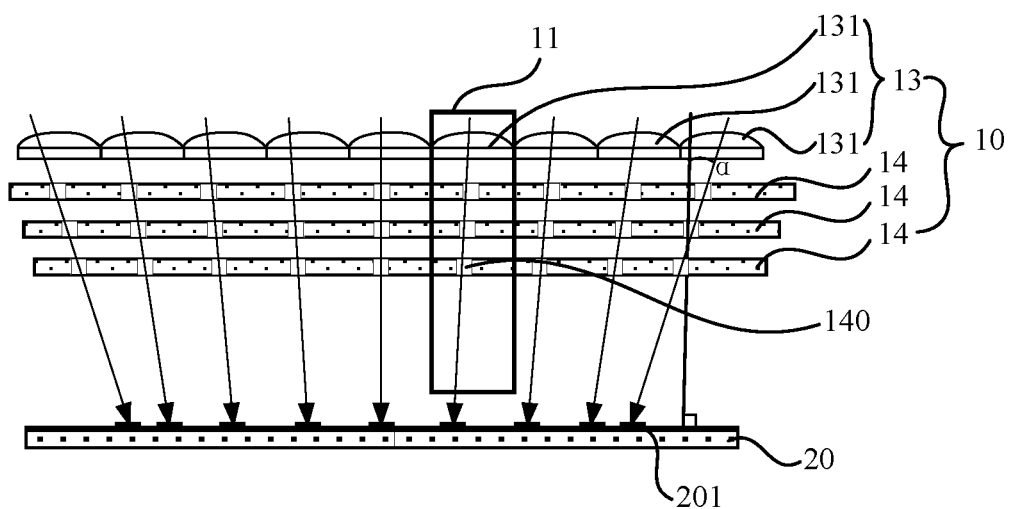
FIG. 3 is a third structural schematic diagram of a biometric information recognition module provided in embodiments of the present disclosure.

FIG. 3 is a third structural schematic diagram of a biometric information recognition module in embodiments of the present disclosure. As shown in FIG. 3, in an optional implementation, as shown in the structural schematic diagram of FIG. 3, three diaphragm layers 14 may be provided, the three diaphragm layers 14 are provided respectively with a diaphragm hole 140 corresponding to each other, and the diaphragm holes form the optical channel 11 together with the foregoing microlens unit 131.

There may be three diaphragm layers 14 for forming the optical channels 11. In the above, to make the optical channel 11 inclined, the microlens unit 131 in the microlens array 13 and the diaphragm hole 140 in each layer of the multiple diaphragm layers 14 need to be adjusted. By adjusting a positional relationship between the microlens unit 131 and the diaphragm hole 140 in each layer that correspondingly form the same optical channel 11, the inclination angle of the optical channel 11, i.e., the included angle α between the optical channel 11 and the first straight line perpendicular to the surface of the microlens array 13, is adjusted.

Certainly, FIG. 3 is merely an exemplary example, but should not be considered as the only implementation form supported in the present solution or limitation to the present solution. In the solutions of the present disclosure, the diaphragm layer 14 also may be provided in number of one, two, four or five, etc.

It should be noted that, in another possible implementation of the embodiments of the present disclosure, a central axial line of the optical channel 11 is a second straight line. For example, as shown in FIG. 3, when the optical channel 11 can be formed only if nodes of more than two elements are arranged and connected with each other, since there is only one straight line between two points, when there are three or more points, it is difficult to ensure formation of the second straight line as shown in FIG. 3 by connecting the three or more points in sequence, for example, it is also possible to result in a broken-line state (every two nodes form a straight line, and if two straight lines are different in slope, a broken line is thus formed). By comparing the two, especially when the optical channel 11 in the present solution has more than three connection nodes, it is certainly optimal that the central axial line of the optical channel 11 formed by the multiple nodes is a straight line. When the connecting line of various nodes forming the central axial line of the optical channel 11 is the second straight line, it means that the light beams carrying the biometric information is consumed least in the optical channel 11. That is to say, as many light beams carrying the biometric information as possible can be allowed to enter the microlens array 13 and to be further received by the photosensitive pixel unit 201.

In an optional implementation, the microlens units 131 and the optical channels 11 are in one-to-one correspondence. That is, each optical channel 11 is corresponding to one microlens unit 131. As shown in FIG. 2, one optical channel 11 may include one microlens unit 131 therein, and the light beams carrying the biometric information that pass through the same microlens unit 131 are correspondingly incident into the diaphragm hole 140 in one optical channel 11, and are correspondingly guided to one corresponding photosensitive pixel unit 201, thus realizing accurate corresponding reception of the light beams from various angles and directions by the photosensitive pixel unit 201.

In another optional implementation, the correspondence relationship in the optical channels 11 may also be set as follows: a plurality of microlens units 131 may be corresponding to one optical channel 11, or one microlens unit 131 is corresponding to a plurality of optical channels 11. That is, each optical channel 11 may include a plurality of microlens units 131, and multiple light beams carrying the biometric information that pass through the plurality of microlens units 131 are correspondingly incident into the diaphragm hole 140 in one optical channel 11, and are correspondingly guided to the photosensitive pixel unit 201, so as to make full use of receiving capability of each photosensitive pixel unit 201. Alternatively, it is also feasible that the same microlens unit 131 is corresponding to a plurality of optical channels 11 simultaneously. Since the microlens unit 131 has certain light beam converging capability, the light beams that pass through the same microlens unit 131 also have different emergent angles to a certain extent due to different incident angles. By making one microlens unit 131 corresponding to the diaphragm holes 140 of a plurality of optical channels 11, the light beams carrying the biometric information are respectively guided to the same or different photosensitive pixel units 201, thus further improving the capability of collecting the light beams carrying the biometric information of the optical channels 11, and reducing loss of optical information during the transmission.

Besides, for the biometric information recognition module in the embodiments of the present disclosure, the correspondence between the optical channels 11 and the photosensitive pixel units 201 in the photosensitive pixel array 20 is not uniquely limited. Exemplarily, each optical channel 11 may be arranged to directly correspond to one photosensitive pixel unit 201 in the photosensitive pixel array 20, then the light beams carrying the biometric information that pass through this optical channel 11 are uniquely and correspondingly incident into this photosensitive pixel unit 201. Alternatively, it is also feasible that a light exit of each optical channel 11 correspond to a plurality of photosensitive pixel units 201, so that the light beams carrying the biometric information emitted from the light exit of the optical channel 11 are received by the plurality of photosensitive pixel units 201 in a matching manner. In addition, for another example, it is also feasible that a plurality of optical channels 11 adjacent to each other may collectively correspond to one photosensitive pixel unit 201, and this photosensitive pixel unit 201 simultaneously receives the light beams carrying the biometric information emitted from the plurality of optical channels 11. The above are instances of some possible implementations, and those skilled in the art accordingly could make specific configurations according to a size of the photosensitive pixel unit 201, a size relationship of the optical channels 11 and other parameters in specific implementations. The solutions cannot be exhaustively listed, and other embodiments conforming to the foregoing correspondence also may be covered within the present solution.

Figure 4:
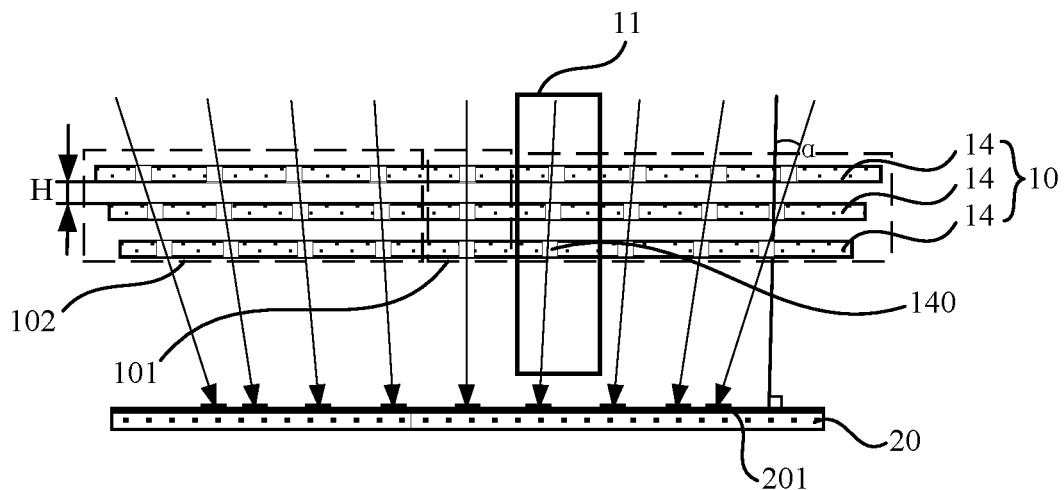
FIG. 4 is a fourth structural schematic diagram of a biometric information recognition module provided in embodiments of the present disclosure.

FIG. 4 is a fourth structural schematic diagram of the biometric information recognition module in embodiments of the present disclosure. As shown in FIG. 4, in an optional implementation, the optical path guiding layer 10 may include a plurality of diaphragm layers 14 provided spaced apart in a light transmission direction. The diaphragm layers 14 can be distributed thereon with a plurality of diaphragm holes 140 that can allow the light beams to pass therethrough. The diaphragm holes 140 positionally corresponding on the plurality of diaphragm layers 14 together form at least a part of the optical channel 11.

Figure 5:
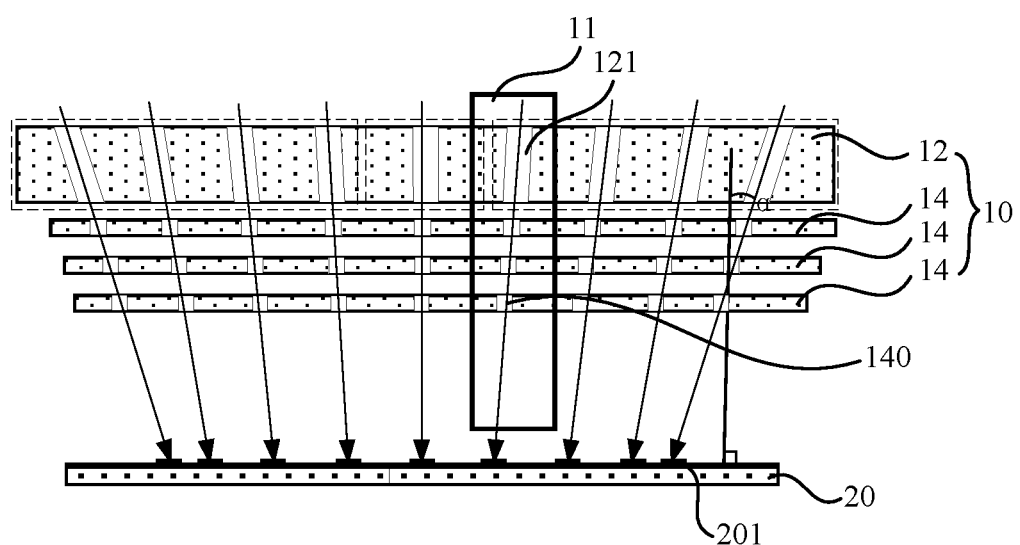
FIG. 5 is a fifth structural schematic diagram of a biometric information recognition module provided in embodiments of the present disclosure.

It should be noted that there are two schemes for the diaphragm holes 140 positionally corresponding on the plurality of diaphragm layers 14 to form at least a part of the optical channel 11. The first one is that the plurality of diaphragm layers 14 themselves are constituent parts of the optical channel 11, i.e., the plurality of diaphragm layers 14 just form the optical channel 11 in the present implementation, with no other structures included, i.e., structure shown in FIG. 4. The second one is that the optical channel 11 is formed together by the plurality of diaphragm layers 14 and other structure, for example, a combined structure of the microlens array 13 and the diaphragm layers 14 or the collimation holes 121 of the basic structure layer 12, and therefore, the plurality of diaphragm layers 14 are only a part of the whole optical channel 11. FIG. 5 is a fifth structural schematic diagram of the biometric information recognition module in embodiments of the present disclosure, as shown in FIG. 5. They are described separately below.

Firstly, that the diaphragm holes 140 in the plurality of diaphragm layers 14 form the whole optical channel 11 is taken as an example. As shown in FIG. 4, each optical channel 11 is formed by combining three diaphragm holes 140 which are positionally corresponding to each other in three diaphragm layers 14, and a center connection line of the three diaphragm holes 140 positionally corresponding in the three diaphragm layers 14 is an inclined straight line. In this way, the optical channel 11 formed can be in the same inclined state, and the light beams carrying biometric characteristics pass through the optical channel 11 formed by the three diaphragm holes 140 in sequence and then are incident into the corresponding photosensitive pixel unit 201.

Secondly, that the diaphragm holes 140 in the plurality of diaphragm layers 14 are only a part of the optical channel 11 is taken as an example. The optical channel 11 in this case further includes any foregoing structure forming the optical channel 11, for example, the collimation hole 121, a combination of the microlens unit 131 and the diaphragm layers 14, or a combination of them, so that they together form the optical channel 11. Specifically, as shown in FIG. 5, each optical channel 11 is formed together by the collimation hole 121 in the basic structure layer 12 and three diaphragm holes 140 positionally corresponding in the three diaphragm layers 14. To pass through the optical channel 11, the light beams carrying the biometric characteristic need to pass through the collimation hole 121 and the three diaphragm holes 140 in sequence. In the above, an inclination angle of the collimation hole 121 is the same as an inclination angle of the center connection line of the three diaphragm holes 140 positionally corresponding in the three diaphragm layers 14, and a connection line of them forms the included angle α of the optical channel 11.

Besides, the optical channel 11 also may be formed through cooperation of other foregoing structures and a plurality of diaphragm holes 140, of which the purpose of formation is the same as multiple foregoing examples, and will not be repeated herein.

In an optional implementation of the embodiments of the present disclosure, as shown in FIG. 4, an interval H between two adjacent diaphragm layers 14 is greater than or equal to 5 micrometers.

For the implementation in which a plurality of diaphragm layers 14 form the optical channel 11 by combination, projection positional relationships between the diaphragm holes 140 on the diaphragm layers 14 of different levels are adjusted, so that the center connection line of the plurality of diaphragm holes 140 of different levels forms the central axial line of the optical channel 11. Therefore, if the interval H between two adjacent diaphragm layers 14 is too small, more diaphragm layers 14 need to be further provided, otherwise, it is hard to form the optical channel 11 with an optical path guiding function between two diaphragm layers 14 having relatively small distance therebetween. Therefore, the interval H between two adjacent diaphragm layers 14 is greater than or equal to 5 micrometers, so as to ensure formation of corresponding light beam guiding capability between the corresponding diaphragm holes 140 in the two diaphragm layers 14.

In an optional implementation of the embodiments of the present disclosure, the included angles α of the optical channels 11 are gradually increased from the central region 101 to the peripheral region 102.

The optical channel 11 formed by three diaphragm holes 140 positionally corresponding in three diaphragm layers 14 is taken as an example. As shown in FIG. 4, there is one included angle α between the main optical axis of each optical channel 11 and the first straight line perpendicular to the photosensitive pixel array 20. This included angle α can reflect the inclination angle at which the light beams passing through this optical channel 11 arrive at the photosensitive pixel unit 201. In the above, the included angle α of the optical channel 11 corresponding to the central region 101 of the optical path guiding layer 10 is of a relatively small degree, and the degree of this included angle α is gradually increased from the central region 101 towards the peripheral region 102. The smaller the degree of the included angle α is, the higher the verticality of the light beams arriving at the photosensitive pixel unit 201 through this optical channel 11 is, the higher the verticality of the light beams received by the photosensitive pixel unit 201 corresponding to the central region 101 of the optical path guiding layer 10 is, and then the biometric characteristic information received thereby has a better collection and analysis value. The degree of the included angle α is gradually increased towards the peripheral region 102. Although the verticality of the light beams is reduced, the biometric information in as large biometric information collection region as possible can be included, which enlarges the collection range of the biometric information. In general, the optical channel 11 of this structure can enable the photosensitive pixel array 20 to obtain better light beam signals, thus, more comprehensive and more accurate biometric information can be analyzed and acquired.

In an optional implementation of the embodiments of the present disclosure, the optical channel 11 in the central region 101 and the first straight line perpendicular to the surface of the photosensitive pixel array 20 also have the included angle α therebetween. That is, when meeting the above condition that the degree value of the included angle α of the optical channel 11 is gradually increased from the central region 101 towards the peripheral region 102, the optical channel 11 in the central region 101 likewise has an included angle, for example, 0.1°, 0.05°, etc.

Alternatively, in another optional implementation of the embodiments of the present disclosure, as shown in FIG. 4, the optical channel 11 in the central region 101 may be parallel to the first straight line perpendicular to the surface of the photosensitive pixel array 20. That is, the light beams carrying the biometric information, which pass through the optical channel 11 in the central region 101 and arrive at the photosensitive pixel unit 201, are incident to the photosensitive pixel unit 201 at a vertical angle. The light beams carrying the biometric information passing through the optical channel 11 in the central region 101 are often located at a position close to the center of the biometric information collection region. Therefore, there is usually no need to expand the collection area. It has been mentioned in the foregoing illustration that when the light beams carrying the biometric information are incident to the photosensitive pixel unit 201, the higher the verticality between the light beams and the photosensitive pixel unit 201 is, the more accurate the biometric information received by the photosensitive pixel unit 201 is, and impact of reflection, glare and the like on reception and analysis of optical information by the photosensitive pixel unit 201 can be reduced, which are not repeated herein. That is to say, in this way, for the central region 101, the included angle α of the optical channel 11 is as small as possible (a limit state is that the included angle α is 0°, i.e., it may be understood as that there is no included angle α at this time, and the optical channel 11 is parallel to the first straight line), so as to ensure sufficient and accurate collection of the biometric characteristic information. With regard to the peripheral region 102, the optical channel 11 may be set to have a certain included angle α, so as to effectively enlarge the area of the collection region of the biometric information that can be received by the photosensitive region of the photosensitive pixel array 20, thus, the biometric characteristic information in a wider range is acquired, thereby improving the recognition accuracy.

In an optional implementation of the embodiments of the present disclosure, the included angles α of the plurality of optical channels 10 in the peripheral region 102 are gradually increased in a direction from a center of the optical path guiding layer towards an edge of the optical path guiding layer 10.

Still referring to FIG. 4, there may be a plurality of optical channels 11 corresponding to the peripheral region 102 in FIG. 4. The included angles α of the plurality of optical channels 11 are of different degrees, and the degrees of the included angles α of the plurality of optical channels 11 are gradually increased in the direction from the center to the edge of the optical path guiding layer 10, that is, the included angle α of the optical channel 11 closer to the edge is larger.

On this basis, in an optional implementation of the embodiments of the present disclosure, the degrees of the included angles α of the plurality of optical channels 11 in the peripheral region 102 are gradually increased at fixed increase amplitude in the direction from the center towards the edge of the optical path guiding layer 10.

Figure 6:
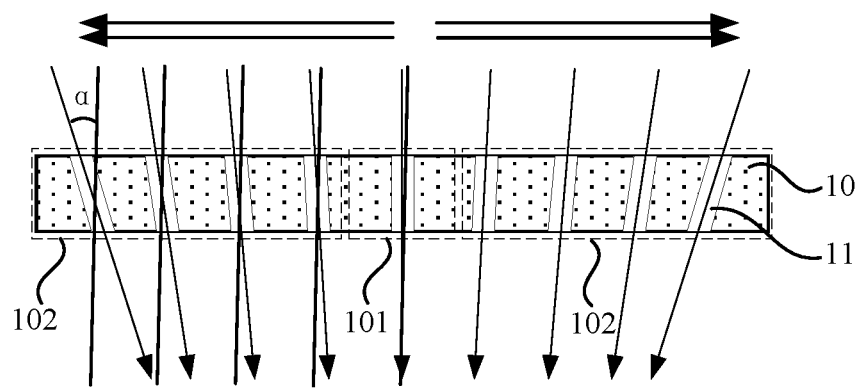
FIG. 6 is a schematic diagram of a relationship between included angles of optical channels of the biometric information recognition module in embodiments of the present disclosure.

Exemplarily, FIG. 6 is a schematic diagram of a relationship between the included angles of the optical channels 11 of the biometric information recognition module provided in embodiments of the present disclosure. As shown in FIG. 6, in directions indicated by double arrows in FIG. 6, i.e., in the directions from the center towards the edges of the optical path guiding layer 10, the included angles α between the optical channels 11 and the first straight line perpendicular to the surface of the photosensitive pixel array 20 tend to increase gradually. In the present example, this increase relationship is at fixed increase amplitude. For example, when the optical channel 11 in the central region 101 is parallel to the first straight line perpendicular to the surface of the photosensitive pixel array 20, that is, when the optical channel 11 in the central region 101 has no included angle α, it may be understood as that the included angle α of the optical channel 11 in the central region 101 is 0. Assuming that the increase amplitude is 2°, in the directions indicated by the double arrows, the included angles α of first optical channels 11 adjacent to the optical channel 11 in the central region 101 are 2°, the included angles α of second optical channels 11 are 4°, the included angles α of third optical channels 11 are 6° and so on, until the included angles α of most marginal optical channels 11 in the peripheral region 102 are largest among all the included angles. It may also be understood as that, in this embodiment, the included angles α of the optical channels 11 are gradually increased stepwise at fixed increase amplitude, in the directions from the center towards the edges of the optical path guiding layer 10.

For example, in an embodiment, the most marginal optical channel 11 in the peripheral region 102 has the largest included angle α of 45°, the number of photosensitive pixel units in the photosensitive pixel array 20 is 300*300, then for each photosensitive pixel unit 201, the fixed increase amplitude of the included angles α of the optical channels 11 can be set to be $^{45}/_{150}$=0.25, i.e. in the directions from the center towards the edges of the optical path guiding layer 10, the included angles α between two adjacent optical channels 11 are increased at the fixed increase amplitude of 0.25°.

Certainly, a fixed stepwise value in the above example is 2°, but in fact, for the precise biometric information recognition module, to accurately acquire the biometric information carried in the light beams and recognize and confirm the same, the optical channels 11 are quite numerous and densely arranged. In practical configuration, the stepwise increase amplitude of the angles obviously is much smaller than 2°. Generally, by setting a smaller stepwise increase amplitude of the angles, after the photosensitive pixel array 20 receives the light beams carrying the biometric information, the difficulty in splicing and analyzing the biometric information received by each photosensitive pixel unit 201 can be effectively lowered, thus reducing the loss of the biometric information, and improving integrity of information acquisition and accuracy of biometric information recognition. Therefore, in an optional example of the embodiments of the present disclosure, the fixed increase amplitude is selected between 0.05° and 2°.

In another optional implementation of the embodiments of the present disclosure, the included angles α of the plurality of optical channels 10 in the peripheral region 102 are gradually increased at variable increase amplitude in the directions from the center towards the edges of the optical path guiding layer 10.

Still taking FIG. 6 as an example, in the present embodiment, in the directions of the double arrows in FIG. 6, the included angles α of the optical channels 11 are gradually increased at variable increase amplitude, that is, differences between the degrees of the included angles α of individual two adjacent optical channels 11 are unequal, for example, 0°, 1°, 3°, 6° . . . . Certainly, in order to enable images formed by the acquired light beams carrying the biometric information to be complete and easily spliced, even if the variable increase amplitude is adopted, certain regularity still should be followed as far as possible, and an excessive angle difference between the included angles α of any two adjacent optical channels 11 should be avoided so as to cause loss of this part of information.

Moreover, as shown in FIG. 6, generally, the optical channels 11 close to the central region 101 have relatively high verticality. Taking the fingerprint recognition as an example, the fingerprint information carried in the light beams passing through the optical channels 11 near the central region 101 is located at a central position of the whole finger. Relatively, these light beams carry more abundant fingerprint information. The fingerprint information, carried in the light beams passing through the optical channels 11 closer to the edge of the peripheral region 102, is located at an edge position of the finger, and it is very hard for these light beams themselves to carry the fingerprint information, moreover, paths of the optical channels 11 are also longer, therefore, this part of light beams comparatively are more likely to have problems of carrying less fingerprint information and losing the fingerprint information. Therefore, when the included angles α of the optical channels 11 are gradually increased at variable increase amplitude in the directions of the double arrows in FIG. 6, the variable increase amplitude can be selected in a way of gradually decreasing in the directions from the center towards the edges of the optical path guiding layer 10.

Exemplarily, the included angle α of the optical channel 11 in the central region may be 1°, the included angle α of the first optical channel 11 in the direction of the double arrows is 4°, that is, a change value between the two is 3°, the included angle α of a next optical channel 11 is 2°, the change value is 2°, the included angle α of a further next optical channel 11 is 1°, the change value is 1°, and so on. In this way, the closer to the edge of the biometric information collection region of the display screen, the denser the collection light beams for the biometric information, so as to effectively compensate the problem that the light beams at the edge of the peripheral region 102 carry less fingerprint information (i.e., the information carrying capacity is small), so that the fingerprint information collected by the photosensitive region of the photosensitive pixel array 20 has better continuity and integrity. It should be noted that, in an optional implementation of the embodiments of the present disclosure, the included angle α of the optical channel 11 cannot be arbitrarily amplified. It has been mentioned in the foregoing descriptions that, when the included angle α of the optical channel 11 is too large, the biometric information carried in the light beams passing through this optical channel 11 will be lost greatly during the transmission, moreover, the light beams pass by a relatively long optical distance during the transmission, then the amount of information that can be extracted and used for subsequent calculation and recognition is very small, when received on the photosensitive pixel unit 201, therefore, exemplarily, the included angle α of the optical channel 11 in the peripheral region 102 may be limited to be less than or equal to 60°. That is, no matter how to divide and provide the plurality of optical channels 11 of the entire optical path guiding layer 10, the largest value of the included angle α of the optical channel 11 should not exceed 60°, so as to ensure an effective reception rate of the biometric information received on the photosensitive pixel unit 201 after the biometric information collection area is enlarged.

In an implementation of the embodiments of the present disclosure, the largest value of the included angle α of the optical channel 11 in the peripheral region 102 should not go beyond 10°-45°, for example, the largest value of the included angle α of the optical channel 11 in the peripheral region 102 may be 10°, 25°, 30°, 45°, etc. By limiting the largest value of the included angle α within this range, it can better ensure the effective reception rate of the biometric information received on the photosensitive pixel unit 201 after the biometric information collection area is enlarged, as well as the biometric information recognition effect of the biometric information recognition module in the embodiments of the present disclosure.

Figure 7:
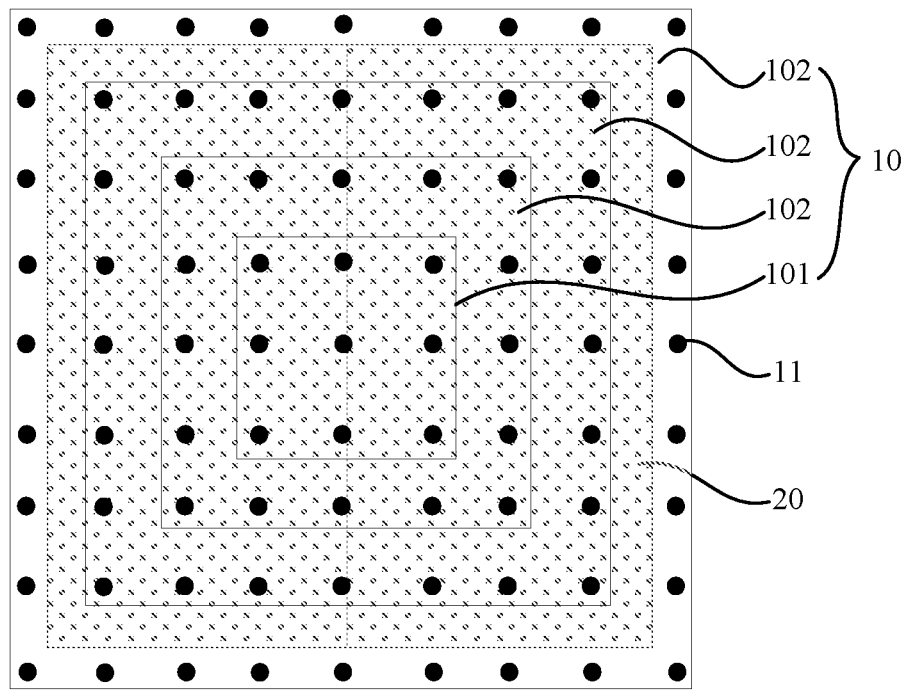
FIG. 7 is a structural schematic diagram of a biometric information recognition module provided in embodiments of the present disclosure from another viewing angle.

FIG. 7 is a structural schematic diagram of a biometric information recognition module provided in embodiments of the present disclosure from another viewing angle. In another optional implementation of the embodiments of the present disclosure, the included angles α of the plurality of optical channels 11 in the central region 101 are of the same degree, and/or, a plurality of peripheral regions 102 are provided surrounding the central region 101, and the included angles α of the plurality of optical channels 11 in the same peripheral region 102 are of the same degree.

Firstly, it can be seen from FIG. 7 that a large number of optical channels 11 are arranged in an array on the optical path guiding layer 10, respectively for transmitting the light beams carrying the biometric information at various positions. The optical path guiding layer 10 may include the central region 101 and three peripheral regions 102 surrounding the central region 101, with the three peripheral regions nested with each other. Equivalently, each peripheral region 102 is in a ring shape, and multiple peripheral regions 102 are nested with each other in a surrounding manner (i.e., the multiple peripheral regions are arranged, with each one sleeved over and surrounding an adjacent one). The central region 101 may include a plurality of optical channels 11. The included angles α of all the optical channels 11 within the range of the central region 101 are of the same degree, for example, the included angles α of all the optical channels 11 within the range of the central region 101 are all of 1°, or the included angles α are all of 0°, etc.

When a plurality of peripheral regions 102 surrounding the central region 101 are provided, the included angles α of the optical channels 11 in different peripheral regions 102 may be set to be of different degrees, but the included angles α of the plurality of optical channels 11 in the same peripheral region 102 are of the same degree, which is equivalent to that when a plurality of peripheral regions 102 are provided, each peripheral region 102 serves as one change gradient, and the optical channels 11 in each change gradient maintain the same degree for the included angles α. Three circles of the peripheral regions 102 are formed outside the central region 101, and each circle of the peripheral region 102 may include a plurality of optical channels 11 therein. FIG. 7 is only a schematic diagram. In fact, in each ring-shaped peripheral region 102, there are a plurality of optical channels 11 regularly arranged in multiple circles. For example, for a first circle of the peripheral region 102 closest to the central region 101, the included angles α of all the optical channels 11 located in this peripheral region 102 are of 2°, and for a second circle of the peripheral region 102, the included angles α of the optical channels 11 in this peripheral region 102 are all of 3°, and so on.

In this way, on one hand, the degrees of the included angles α of the optical channels 11 of the entire biometric information recognition module have a gradient change relationship, and on the other hand, through regional division of the central region 101 and the peripheral regions 102, all the optical channels 11 can be divided into regions and the degrees of the included angles are set, then design and production can be quantified, which facilitates production and processing, simplifies difficulty and requirements of a preparation process, and also reduces calculation difficulty of post-data processing. Moreover, it can be seen from FIG. 7 that the photosensitive region of the photosensitive pixel array 20 (i.e., a photosensitive receiving surface of the photosensitive pixel array 20, which can be understood in FIG. 7 as a range shown of the photosensitive pixel array 20) can be set with a smaller size than that of the optical path guiding layer 10. By setting the included angles α of the optical channels 11 in various regions on the optical path guiding layer 10, it is realized to receive the light beams in a region larger than the photosensitive region of the photosensitive pixel array 20. In an optional implementation of the embodiments of the present disclosure, the center of the central region 101 coincides with centers of the peripheral regions 102; and/or, in an optional implementation of the embodiments of the present disclosure, the peripheral regions 102 are in a round ring shape, a square ring shape, a triangular ring shape or an irregular ring shape.

As shown in FIG. 7, the center of the central region 101 is provided to coincide with the centers of the peripheral regions 102. When the peripheral regions 102 are in a round ring shape, it is equivalent to that the central region 101 and the peripheral regions 102 are concentric. In this way, it is convenient to quantify the design and production, facilitate the production and processing, simplify the difficulty and requirement of a preparation process, and meanwhile lower calculation difficulty of post-data processing.

In an optional implementation of the embodiments of the present disclosure, the peripheral regions 102 are each in a round ring shape with the center of the central region 101 as a circle center. Alternatively, as shown in FIG. 7, the peripheral regions 102 are each in a square ring shape centered on the center of the central region 101. For another example, the peripheral regions 102 also may be in a quadrate ring shape, a triangular ring shape, or an irregular ring shape.

A shape of an outer edge of the central region 101 and the ring shape of the peripheral region 102 can be designed and set according to actual needs, and are not limited to the foregoing examples. They are not specifically limited in the embodiments of the present disclosure.

If the peripheral regions 102 surrounding the central region 101 are considered as a whole, the peripheral regions 102 may include at least two sub-regions, i.e., a first sub-region and a second sub-region located at the periphery of the first sub-region, and the included angles α of the optical channels 11 in the first sub-region are set to be greater than the included angles α of the optical channels 11 in the second sub-region. Moreover, it is also feasible to set the included angles α of the plurality of optical channels 11 in the first sub-region to be of a same degree, and the included angles α of the plurality of optical channels 11 in the second sub-region to be of another same degree.

In an optional embodiment of the present disclosure, the included angle α of each optical channel 11 is related to a distance from the optical channel 11 to the center of the optical path guiding layer 10. The larger the distance is, that is, the closer the optical channel is to the edge of the optical path guiding layer 10, the larger the included angle α of the optical channel 11 is. If this distance is divided into equal sections, from the center towards the edge of the optical path guiding layer 10, the included angle of the optical channel 11 is corresponding to one section of the distance, and the included angles α of the optical channels 11 falling within the same section of the distance are all of the same degree. Exemplarily, taking the peripheral regions 102 being in a square ring shape centered on the center of the central region 101 shown in FIG. 7 as an example, each layer of the peripheral region 102 may have a width of 1 pixel, wherein 1 pixel is corresponding to one photosensitive pixel unit 201, that is, the optical channels 11 in each layer of the peripheral region 102 are corresponding to the photosensitive pixel units 201 in a ring-shaped circle on the photosensitive pixel array 20.

In an optional implementation of the embodiments of the present disclosure, on a longitudinal section passing the central region 101, a plurality of optical channels 11 are arranged in a fan shape centered on the central region 101.

Taking FIG. 6 as an example, it is a longitudinal sectional view of the biometric information recognition module in the embodiments of the present disclosure that passes the central region 101. In this sectional direction, the plurality of optical channels 11 are centered on the central region 101, and are arranged in a fan shape as a whole due to the inclination directions and angles thereof.

In this manner, the light beams carrying the biometric information reflected by the display screen above can be received in a larger range and guided to the photosensitive pixel array 20 for reception, so that the photosensitive pixel array 20 receives as much biometric information as possible, which facilitates subsequent calculation and processing, and improves the accuracy of the biometric information recognition. As long as the fan-shaped arrangement can be obtained, the image acquisition region corresponding to the photosensitive pixel array 20 is necessarily in an expanded state, with fan-shaped divergence, so as to prevent the situation of overall offset formed when the inclination directions of the optical channels 11 at two opposite sides of the central region 101 are the same, in which situation the image acquisition region is only positionally offset relative to the photosensitive region, while the image acquisition region is not substantially expanded.

Figure 8:
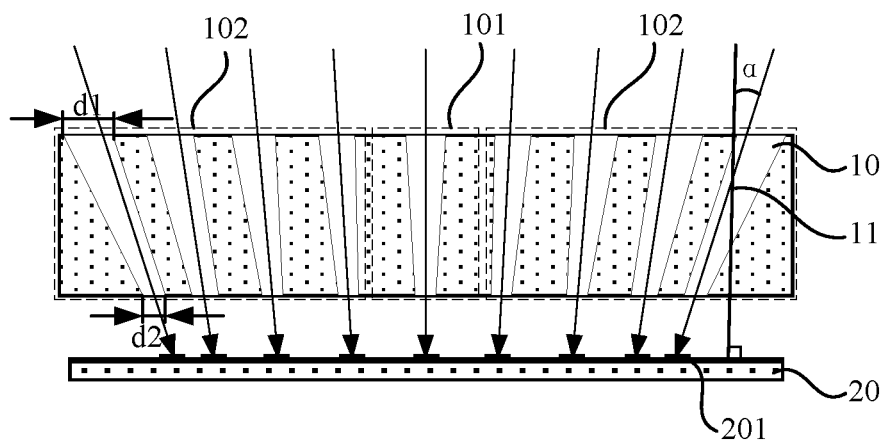
FIG. 8 is a sixth structural schematic diagram of a biometric information recognition module provided in embodiments of the present disclosure.

FIG. 8 is a sixth structural schematic diagram of a biometric information recognition module provided in embodiments of the present disclosure. In an optional implementation of the embodiments of the present disclosure, for at least some of the optical channels 11, channel diameters d1 of ends thereof away from the photosensitive pixel array 20 are greater than or equal to channel diameters d2 of ends thereof close to the photosensitive pixel array 20.

Exemplarily, taking that the optical channels 11 are the collimation holes 121 in the basic structure layer 12 as an example, as shown in FIG. 8, the collimation holes 121 as a whole are of an inverted trapezoid structure, and the channel diameter d1 of one end of the optical channel 11 away from the photosensitive pixel array 20 is greater than the channel diameter d2 of one end thereof close to the photosensitive pixel array 20. In this way, when the light beams carrying the biometric information are reflected by the display screen and incident to the collimation holes 121 from above, as the d1 diameter value is larger, as many light beams as possible can be incident into the optical channels 11, and after the light beams are guided and transmitted by the optical channels 11, since an exit of each optical channel 11 has a smaller d2 diameter value, the light beams output from the collimation holes 121 can be accurately and directly incident to the corresponding photosensitive pixel units 201.

On this basis, in an optional implementation of the embodiments of the present disclosure, the channel diameter of each optical channel 11 may be further set to gradually increase in a direction in which the light beams are incident to the photosensitive pixel unit 201. That is, the channel diameter is uniformly increased in the direction in which the light beams are incident to the photosensitive pixel unit 201. Compared with stepped increase, such a manner of gradually increasing the channel diameter has better light guiding capability and reduces light loss during light guidance.

In an optional implementation of the embodiments of the present disclosure, the central axial lines of the optical channels 11 are second straight lines, and in a longitudinal section passing the second straight lines, for at least some optical channels 11, two boundaries of each optical channel form different included angles with the first straight line.

The central axial lines of the optical channels 11 are defined as the second straight lines. In the longitudinal section passing the second straight lines, for at least some optical channels 11, two boundaries of each optical channel 11 form different included angles (the two boundaries are two opposite sides of the optical channel 11, and the different included angles may be defined as a first boundary angle and a second boundary angle respectively) with the first straight line, i.e., the longitudinal section of each optical channel 11 can be of an asymmetric structure, for example, the longitudinal section is in a right trapezoid shape.

On this basis, exemplarily, for at least some of the optical channels 11, the first boundary angle of each optical channel 11 may be smaller than the second boundary angle thereof, the first boundary angle is an included angle between the boundary of the optical channel 11 close to the central region 101 and the first straight line, and the second boundary angle is an included angle between the boundary of the optical channel 11 far away from the central region 101 and the first straight line. That is, when the first boundary angle and the second boundary angle are different, it requires that the inclination directions should be as shown in FIG. 8, towards the center, that is to say, the first boundary angle close to the central region 101 is smaller, and the second boundary angle far away from the central region 101 is larger, so as to satisfy that that light beams at edges of expanded image acquisition region are collected and incident in inclined directions.

Figure 9:
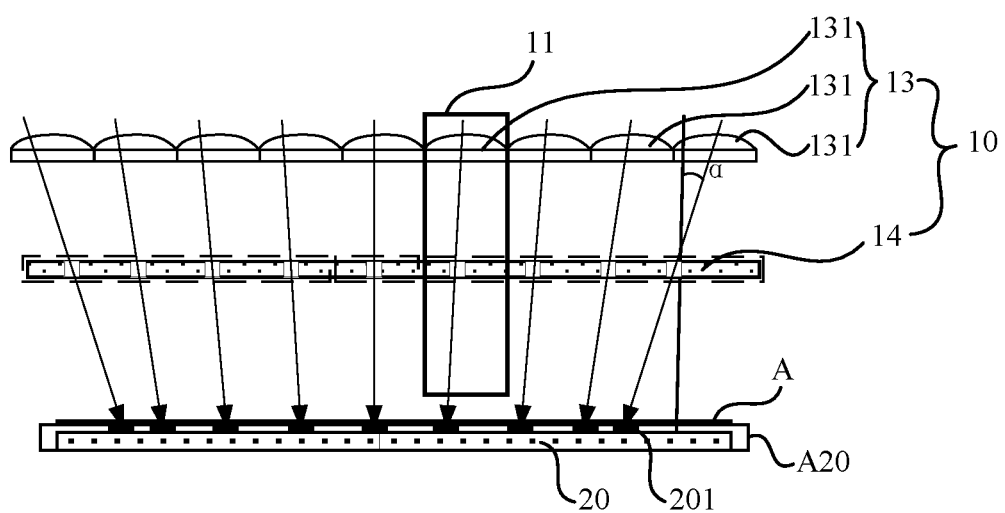
FIG. 9 is a seventh structural schematic diagram of a biometric information recognition module provided in embodiments of the present disclosure.

FIG. 9 is a seventh structural schematic diagram of a biometric information recognition module provided in embodiments of the present disclosure. In an optional implementation of the embodiments of the present disclosure, as shown in FIG. 7, the biometric information recognition module in an embodiment of the present disclosure further includes an optical sensor A20, and the photosensitive pixel array 20 is integrated in a photosensitive recognition region A of the optical sensor A20.

The optical sensor A20 is a semiconductor package chip, that has light-sensing capability for optical signals, and can perform photoelectric conversion on the sensed optical signal, and convert characteristic information carried in the optical signal into optical signal for recording and recognition, such as CCD (charge coupled device), CMOS (complementary metal oxide semiconductor), MEMS (micro-electrical mechanical system), etc. When the the optical sensor A20 is used as a package chip in the biometric information recognition module in an embodiment of the present disclosure, the photosensitive pixel array 20 can be integrated into the photosensitive recognition region A of the optical sensor A20. The package structure is compact, and has the advantages such as strong working stability and good sensing capability, thus better assisting the miniaturization of module structure and adaptability to environment while ensuring the recognition capability.

In an optional implementation of the embodiments of the present disclosure, the optical sensor A20 may include a metal structure layer A1, the optical path guiding layer 10 may further include metal shading layer(s) 110, and the metal shading layer 110 is realized by also using the metal structure layer A1 on the optical sensor A20; and the at least one metal shading layer 110 may be correspondingly provided with light-transmitting portions 111 so as to form the optical channels 11.

Figure 10:
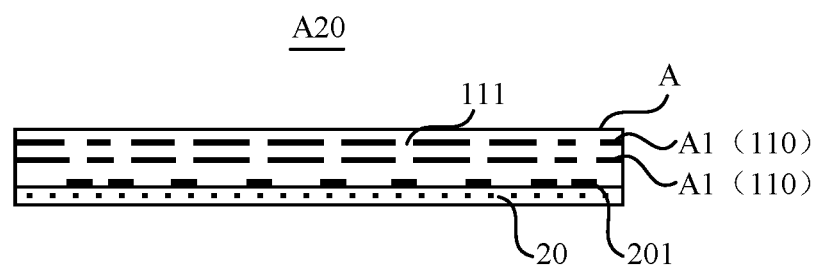
FIG. 10 is a structural schematic diagram of an optical sensor in a biometric information recognition module provided in embodiments of the present disclosure.

FIG. 10 is a structural schematic diagram of an optical sensor in a biometric information recognition module provided in embodiments of the present disclosure. As shown in FIG. 10, in a layered (hierarchical) structure of the optical sensor A20, the metal structure layers A1 may be included. The metal structure layers A1 are used for preparing a corresponding metal pattern in the optical sensor A20 so as to realize a function desired by the optical sensor A20. In the biometric information recognition module, the optical path guiding layer 10 may include the metal shading layers 110 formed on the metal layer. Due to the same metal material, the metal shading layer 110 may be also realized by using the metal structure layer A1 on the optical sensor A20. That is, on the metal structure layer A1, the existing metal pattern is used or the metal pattern required by the metal shading layer 110, such as the light-transmitting portion 111, is further formed on the basis that implementation of original function is not affected, so that the metal structure layer A1 is used again as the metal shading layer 110.

In the above, FIG. 10 shows a specific implementation in which two metal structure layers A1 are again used as the two metal shading layers 110 in the optical path guiding layer 10. In an optional implementation of the embodiments of the present disclosure, it is also feasible to provide 2-5 metal structure layers A1. In this way, most or all of the metal shading layers 110 may be provided by using again the metal structure layers A1 on the optical sensor A20, thereby further effectively reducing structural volume.

Figure 11:
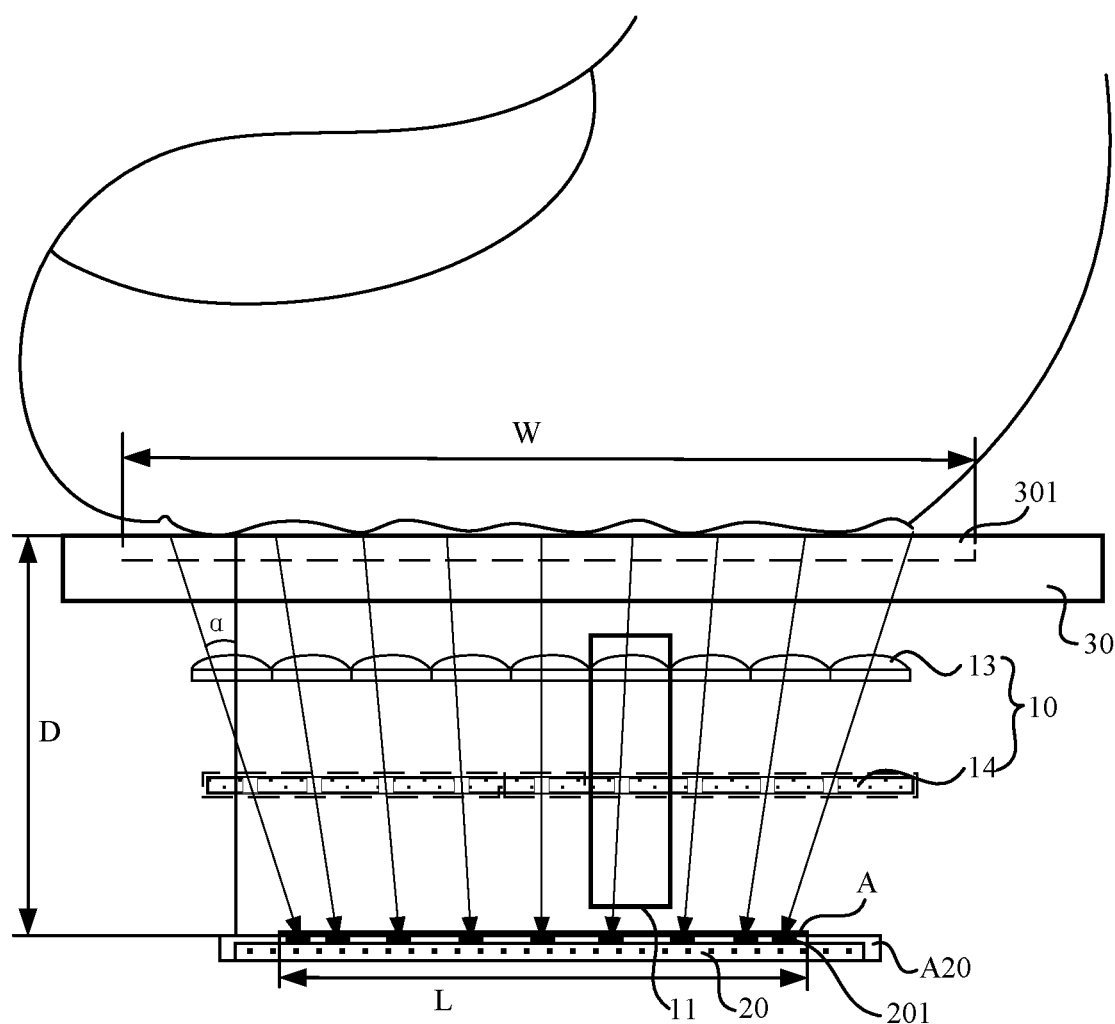
FIG. 11 is a structural schematic diagram of an electronic device provided in embodiments of the present disclosure.

In another aspect of the embodiments of the present disclosure, an electronic device is further provided. FIG. 11 is a structural schematic diagram of an electronic device provided in embodiments of the present disclosure. The electronic device may include a display screen 30 and a biometric information recognition module according to any one of the preceding arranged under the display screen 30.

A user fits a carrier, such as a finger or a palm, possessing individual biometric characteristics in an image acquisition region of the display screen 30. Taking under-display fingerprint recognition as an example, the light beams irradiating fingerprint lines and reflected can carry line characteristics at an irradiated finger position as fingerprint information. The light beams carrying the fingerprint information are guided and transmitted by the optical path guiding layer 10 in the biometric information recognition module and then are incident to the photosensitive pixel array 20. Through the guiding effect of the optical path guiding layer 10, the light beams carrying the biometric information in a wider region range can be made to enter the photosensitive pixel array 20, so that the electronic device in the embodiments of the present disclosure can receive more optical signals reflected by the fingerprints, and thus obtain more fingerprint information, which, without increasing the image acquisition area of the display screen 30, effectively increases a pixel collection range of the photosensitive pixel array 20, improves the recognition accuracy of biometric information recognition, and meanwhile can reduce manufacturing cost of the electronic device, efficiently utilize the structural size of the module, and save more internal space for the electronic device.

In an optional implementation of the embodiments of the present disclosure, a biometric information recognition region 301 configured to acquire the light beams carrying the biometric information can be pre-provided on the display screen 30, wherein an area of the biometric information recognition region 301 may be larger than a light beam reception area of the photosensitive pixel array 20 in the biometric information recognition module.

Taking a width direction as an example, W is an area of the biometric information recognition region 301, and W satisfies:

$$W = (L + D * \tan\alpha)^2; \quad (1)$$

In the above, L is a side length of the photosensitive pixel array 20, D is a distance between an upper surface of the display screen 30 and the photosensitive pixel array 20, and α is the included angle between the optical channel 11 and the first straight line perpendicular to the surface of the photosensitive pixel unit 201.

As can be seen from formula (1) and FIG. 11, in this width direction, through the guiding effect of the optical path guiding layer 10, the light beams carrying the biometric information in a wider width range can be made to be incident to the photosensitive pixel array 20. By the same reasoning, in other width directions, the light beams carrying the biometric information in a wider width range can also be made to be incident to the photosensitive pixel array 20 through the guiding effect of the optical path guiding layer 10. Therefore, the area W of the biometric information recognition region 301 is larger than the light beam reception area of the photosensitive pixel array 20 in the biometric information recognition module. That is, without changing the existing area of the biometric information recognition region 301, use of the biometric information recognition module in the embodiments of the present disclosure can reduce the area of the photosensitive recognition region A on the optical sensor A20 while ensuring the acquisition and recognition of the biometric information, thereby reducing the cost, contributing to miniaturization of the electronic device, and reserving a space for internal structure design and planning of the electronic device.

The above-mentioned are merely embodiments of the present disclosure and not intended to limit the scope of protection of the present disclosure. For those skilled in the art, various modifications and changes could be made to the present disclosure. Any modifications, equivalent substitutions, improvements and so on made within the spirit and principle of the present disclosure should be covered within the scope of protection of the present disclosure.

INDUSTRIAL APPLICABILITY

The biometric information recognition module provided according to the present disclosure includes the optical path guiding layer and the photosensitive pixel array which are arranged in sequence. The optical path guiding layer includes a plurality of optical channels. The photosensitive pixel array includes a plurality of photosensitive pixel units. The light beams carrying the biometric information pass through the optical channels and are then incident on the corresponding photosensitive pixel units. In the above, the optical path guiding layer includes the central region and the peripheral region surrounding the central region, and each optical channel in the peripheral region has the included angle with the first straight line perpendicular to the surface of the photosensitive pixel array. Through the guiding effect of the optical channels having the included angles with the first straight line, the light beams carrying the biometric information within a wider range area can be made to be incident to the photosensitive pixel array. That is, without changing the area of the photosensitive pixel array, the biometric information collection area of the display screen is increased, so that the biometric information collection area is greater than the area of photosensitive region of the photosensitive pixel array, further enabling the biometric information recognition module in the present disclosure to receive more optical signals, thereby obtaining more biometric information.

In addition, it can be understood that the biometric information recognition module, the optical path guiding layer, the photosensitive pixel array etc. in the present disclosure are reproducible, and can be applied in various industrial applications. For example, the biometric information recognition module in the present disclosure can be applied to electronic devices for obtaining the biometric information.

What is claimed is:

1. A biometric information recognition module, comprising an optical path guiding layer and a photosensitive pixel array which are arranged in sequence, wherein the optical path guiding layer comprises a plurality of optical channels, the photosensitive pixel array comprises a plurality of photosensitive pixel units, and light beams carrying biometric information pass through the optical channels respectively and then are incident on the corresponding photosensitive pixel units, wherein the optical path guiding layer comprises a central region and at least one peripheral region surrounding the central region, and the optical channels in the at least one peripheral region have included angles with a first straight line perpendicular to a surface of the photosensitive pixel array;

wherein the included angles of the plurality of optical channels in the at least one peripheral region are gradually increased in a direction from a center towards an edge of the optical path guiding layer.

2. The biometric information recognition module according to claim 1, wherein the included angles of the plurality of optical channels in the at least one peripheral region are gradually increased at fixed increase amplitude or variable increase amplitude in the direction from the center towards the edge of the optical path guiding layer.

3. The biometric information recognition module according to claim 1, wherein the fixed increase amplitude is 0.05°~2°.

4. The biometric information recognition module according to claim 1, wherein the variable increase amplitude is gradually decreased in the direction from the center towards the edge of the optical path guiding layer.

5. The biometric information recognition module according to claim 1, wherein the plurality of optical channels in the central region have included angles with the first straight line, and the included angles are same, and/or, a plurality of the peripheral regions surrounding the central region are provided, and the included angles between the first straight line and the plurality of optical channels in a same peripheral region are same.

6. The biometric information recognition module according to claim 1, wherein a center of the central region coincides with a center of the at least one peripheral region; and/or, the at least one peripheral region is in a round ring shape, a square ring shape, a triangular ring shape or an irregular ring shape.

7. The biometric information recognition module according to claim 1, wherein on a longitudinal section passing the central region, a plurality of the optical channels are arranged in a fan shape centered on the central region.

8. The biometric information recognition module according to claim 1, wherein for at least some of the optical channels, channel diameters of an end thereof away from the photosensitive pixel array are greater than or equal to channel diameters of an end thereof close to the photosensitive pixel array.

9. The biometric information recognition module according to claim 8, wherein central axial lines of the optical channels are second straight lines, and in a longitudinal section passing the second straight lines, two boundaries of each of at least some of the optical channels form different included angles with the first straight line.

10. The biometric information recognition module according to claim 9, wherein for at least some of the optical channels, the optical channel has a smaller first boundary angle than a second boundary angle, the first boundary angle is an included angle between the first straight line and the boundary of the optical channel close to the central region, and the second boundary angle is an included angle between the first straight line and the boundary of the optical channel away from the central region.

11. The biometric information recognition module according to claim 1, wherein the optical path guiding layer is provided with a plurality of collimation holes running therethrough, and the plurality of collimation holes respectively serve as the optical channels.

12. The biometric information recognition module according to claim 1, wherein the optical path guiding layer comprises a microlens array and at least one diaphragm layer disposed under the microlens array, a plurality of diaphragm holes configured to allow the light beams to pass therethrough are distributed on the at least one diaphragm layer, the microlens array comprises a plurality of microlens units, and the microlens units and the diaphragm holes corresponding to the microlens units serve as the optical channels.

13. The biometric information recognition module according to claim 1, wherein the optical path guiding layer comprises a plurality of diaphragm layers provided spaced apart in a light transmission direction, a plurality of diaphragm holes configured to allow the light beams to pass therethrough are distributed on the diaphragm layers, and the diaphragm holes positionally corresponding to each other on the plurality of diaphragm layers together form at least a part of the corresponding optical channel.

14. The biometric information recognition module according to claim 1, wherein the included angles of the optical channels in the at least one peripheral region are less than or equal to 60°.

15. The biometric information recognition module according to claim 14, wherein the included angles of the optical channels in the at least one peripheral region are less than or equal to 10°-45°.

16. The biometric information recognition module according to claim 1, further comprising an optical sensor, wherein the photosensitive pixel array is integrated in a photosensitive recognition region of the optical sensor.

17. The biometric information recognition module according to claim 16, wherein the optical sensor comprises at least one metal structure layer, the optical path guiding layer further comprises at least one metal shading layer, and the at least one metal shading layer is realized by also using the at least one metal structure layer on the optical sensor; and the at least one metal shading layer is correspondingly provided with light-transmitting portions so as to form the optical channels.

18. An electronic device, comprising a display screen and the biometric information recognition module according to claim 1 arranged under the display screen.

19. The electronic device according to claim 18, wherein a biometric information recognition region configured to acquire the light beams carrying the biometric information is pre-provided on the display screen, and an area of the biometric information recognition region is larger than a light beam reception area of the photosensitive pixel array in the biometric information recognition module.

* * * * *